United States Patent
Kudo

(10) Patent No.: US 8,769,107 B2
(45) Date of Patent: Jul. 1, 2014

(54) TECHNIQUE FOR CREATING PRINT DATA

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 337 days.

(21) Appl. No.: 12/241,749

(22) Filed: Sep. 30, 2008

(65) Prior Publication Data

US 2009/0089355 A1  Apr. 2, 2009

(30) Foreign Application Priority Data

Oct. 1, 2007  (JP) ................. 2007-258096

(51) Int. Cl.
 - *G06F 15/16* (2006.01)
 - *G06K 15/02* (2006.01)
 - *G06F 3/12* (2006.01)

(52) U.S. Cl.
 CPC .............. *G06K 15/02* (2013.01); *G06F 3/1244* (2013.01); *G06F 3/1246* (2013.01); *G06K 15/1802* (2013.01); *G06F 3/1202* (2013.01); *G06K 15/1807* (2013.01)
 USPC ........................................ 709/227; 358/1.15

(58) Field of Classification Search
 USPC ........................................................ 709/227
 See application file for complete search history.

(56) References Cited

U.S. PATENT DOCUMENTS

| | | | |
|---|---|---|---|
| 5,014,221 A | | 5/1991 | Mogul |
| 5,754,789 A | * | 5/1998 | Nowatzyk et al. ............ 709/233 |
| 5,970,228 A | * | 10/1999 | Nezu ............................... 726/34 |
| 6,784,925 B1 | | 8/2004 | Tomat et al. |
| 7,207,735 B2 | * | 4/2007 | Narusawa et al. .............. 400/76 |
| 7,233,972 B2 | * | 6/2007 | Minow ........................... 709/203 |
| 7,377,421 B2 | * | 5/2008 | Rhoads .......................... 235/375 |
| 7,448,047 B2 | * | 11/2008 | Poole et al. ................... 719/316 |

(Continued)

FOREIGN PATENT DOCUMENTS

| | | |
|---|---|---|
| EP | 1 415 820 | 5/2004 |
| JP | 11-154072 | 6/1999 |

(Continued)

OTHER PUBLICATIONS

European Search Report issued in European Patent Application No. EP 08253173.2-1245, dated Feb. 12, 2009.

(Continued)

*Primary Examiner* — Andrew Goldberg
(74) *Attorney, Agent, or Firm* — Banner & Witcoff, Ltd.

(57) ABSTRACT

A print data creation device may perform a plurality of tasks in parallel. The print data creation device may be provided with a first download device, a second download device, and a sending controller. The first download device may be configured to perform a first task for downloading first data in predetermined data size units from an external device. The second download device may be configured to download second data from the external device in accordance with an address of the second data in a case where the first data having the predetermined data size includes the address of the second data. The second data may be necessary for performing a second task. The sending controller may be configured to prohibit a first download request for downloading the second data from being sent to the external device during the downloading of the first data having the predetermined data size, and to prohibit a second download request for downloading the first data having the predetermined data size from being sent to the external device during the downloading of the second data.

10 Claims, 13 Drawing Sheets

(56) References Cited

U.S. PATENT DOCUMENTS

| | | | |
|---|---|---|---|
| 7,634,583 B2* | 12/2009 | Sagar et al. | 709/250 |
| 2002/0191213 A1* | 12/2002 | Laverty et al. | 358/1.15 |
| 2003/0093702 A1* | 5/2003 | Luo et al. | 713/320 |
| 2003/0110304 A1* | 6/2003 | Iwaishi et al. | 709/250 |
| 2003/0231346 A1* | 12/2003 | Tagawa | 358/1.18 |
| 2004/0066529 A1* | 4/2004 | Wu et al. | 358/1.15 |
| 2004/0169880 A1* | 9/2004 | Nakanishi et al. | 358/1.15 |
| 2004/0179105 A1 | 9/2004 | Endo et al. | |
| 2004/0179115 A1 | 9/2004 | Tomat et al. | |
| 2005/0055476 A1* | 3/2005 | Aschenbrenner et al. | 710/15 |
| 2005/0138112 A1* | 6/2005 | Sagar et al. | 709/203 |
| 2005/0141941 A1* | 6/2005 | Narusawa et al. | 400/76 |
| 2005/0172078 A1* | 8/2005 | Wu et al. | 711/133 |
| 2005/0275852 A1* | 12/2005 | Ferlitsch | 358/1.6 |
| 2005/0275861 A1* | 12/2005 | Ferlitsch | 358/1.13 |
| 2006/0138227 A1* | 6/2006 | Alleshouse | 235/432 |
| 2006/0239568 A1* | 10/2006 | Hanes et al. | 382/233 |
| 2006/0288278 A1* | 12/2006 | Kobayashi | 715/523 |
| 2007/0035766 A1* | 2/2007 | Yamamura | 358/1.15 |
| 2007/0097416 A1* | 5/2007 | Higashimura et al. | 358/1.15 |
| 2007/0236724 A1* | 10/2007 | Rai et al. | 358/1.15 |
| 2009/0180133 A1* | 7/2009 | Yamamoto | 358/1.13 |
| 2009/0207254 A1 | 8/2009 | Tomat et al. | |

FOREIGN PATENT DOCUMENTS

| | | |
|---|---|---|
| JP | 11184789 A | 7/1999 |
| JP | 11355706 A | 12/1999 |
| JP | 2000207324 A | 7/2000 |
| JP | 2001014246 A | 1/2001 |
| JP | 2003108453 A | 4/2003 |
| JP | 2004-303192 | 10/2004 |

OTHER PUBLICATIONS

Notification of Reasons for Rejection for corresponding Japanese Patent Application No. 2011-271986 mailed Jun. 19, 2012.

Notification of Reasons for Rejection for Japanese patent application No. 2007-258096 mailed Oct. 25, 2011.

* cited by examiner

FIG. 3

Job Creation Request 60

```
<CreateURIJob>
  <JobName>Test Print</JobName>
  <JobOriginatingUserName>Test User</JobOriginatingUserName>
  <DocumentFormat>application/xhtml-print</DocumentFormat>
  <Copies>1</Copies>
  <Sides>one-sided</Sides>
  <NumberUp>1</NumberUp>
  <OrientationRequested>portrait</OrientationRequested>
  <MediaSize>iso_a4_210x297mm</MediaSize>
  <MediaType>stationery</MediaType>
  <PrintQuality>normal</PrintQuality>
  <CriticalAttributesList>none</CriticalAttributesList>
  <SourceURI>http://192.168.1.11:1025/a045f2e1.xhtml</SourceURI>     ← 62
</CreateURIJob>
```

FIG. 4

XHTML-Print Data 70

```
<?xml version="1.0" encoding="UTF-8"?>
<!DOCTYPE html PUBLIC "-//W3C//DTD XHTML-Print 1.0//EN"
 "http://www.w3.org/MarkUp/DTD/XHTML-Print10.dtd">
<html xmlns="http://www.w3.org/1999/xhtml">
<head>
<title>4up_lscape_A4_90x130mm</title>
<base href="http://192.168.1.11:1025/pub/DLNA/PhotoTemplates/" />    ← 72
<link rel="stylesheet" href="default.css" type="text/css" />   ← 72a
</head>                                        ← 74a
<body>
<div class="page_last">
 <div class="img1"><img src="image1.jpg" class="img_34_0deg" alt="photo"/>X</div>
 <div class="img2"><img src="image2.jpg" class="img_34_0deg" alt="photo"/>X</div>
 <div class="img3"><img src="image3.jpg" class="img_34_0deg" alt="photo"/>X</div>
 <div class="img4"><img src="image4.jpg" class="img_34_0deg" alt="photo"/>X</div>
</div>
</body>
</html>
```

Style Sheet File 80

```
@media print {@page {size:A4; margin:3mm;}}
div.page_last {position:relative;}
div.img1 {overflow:hidden; padding:0mm; position:absolute;
          top:151mm; left:7mm; width:90mm; height:130mm;}
div.img2 {overflow:hidden; padding:0mm; position:absolute;
          top:9mm; left:7mm; width:90mm; height:130mm;}       }-82
div.img3 {overflow:hidden; padding:0mm; position:absolute;
          top:151mm; left:107mm; width:90mm; height:130mm;}
div.img4 {overflow:hidden; padding:0mm; position:absolute;
          top:9mm; left:107mm; width:90mm; height:130mm;}
img.img_34_0deg {height:130mm; width:97.5mm;                  }-84
          margin-left: -3.75mm; image-orientation:270deg;}
```

FIG. 12

Session Table 100

| # | IP | Port | Handle Number | State |
|---|---|---|---|---|
| 1 | 192.168.1.11 | 1025 | 1 | Unlock |
| 2 | 10.1.1.5 | 8080 | 3 | Lock |
| 3 | 192.168.5.234 | 80 | 1 | Unlock |
| ⋮ | ⋮ | ⋮ | ⋮ | ⋮ |

FIG. 13

Handle Table 130

| # | Session# | URL | State |
|---|---|---|---|
| 1 | 1 | http://192.168.1.11:1025/a045f2e1.xhtml | Wait |
| 2 | 2 | http://101.1.1.5:8080/test.xhtml | Wait |
| 3 | 2 | http://101.1.1.5:8080/normal.css | Wait |
| 4 | 3 | http://192.168.5.234/93fe77.html | Wait |
| 5 | 2 | http://101.1.1.5:8080/logo.jpg | Downloading |
| ... | ... | ... | ... |

TECHNIQUE FOR CREATING PRINT DATA

CROSS-REFERENCE TO RELATED APPLICATION

This application claims priority to Japanese Patent Application No. 2007-258096, filed on Oct. 1, 2007, the contents of which are hereby incorporated by reference into the present application.

BACKGROUND OF THE INVENTION

1. Field of the Invention

The present invention relates to a technique for creating print data by performing a plurality of tasks in parallel.

2. Description of the Related Art

A printer that creates print data is set forth in, for example, US Patent Application Publication No. 2004/179105. This printer receives XML script data. An address of image data is included in the XML script data. The printer downloads image data from an external device in accordance with the address of the image data. The printer creates print data by rasterizing the downloaded image data.

BRIEF SUMMARY OF THE INVENTION

A technique is set forth in the present specification for creating print data by performing a plurality of tasks in parallel. In a case where a plurality of tasks is performed in parallel, there is a possibility that a phenomenon in which, while data is being downloaded from an external device based on one task, a download request for other data based on another task is simultaneously sent to the same external device may occur. External devices include devices that are capable of a plurality of simultaneous connections (multi-connection type devices), and devices that do not allow a plurality of simultaneous connections; such as home electronics (single-connection type devices). If a single connection type device receives another download request while sending data in accordance with one download request, the single connection type device is not capable of sending the data in response to the other download request. In this case, there is a possibility that a phenomenon in which data for creating print data cannot be downloaded may occur.

A technique is taught in the present specification whereby data for creating print data can be downloaded reliably.

One technique taught in the present specification is a print data creation device for creating print data by performing a plurality of tasks including a first task and a second task in parallel. The term 'print data creation device' includes all types of devices that create print data. For example, the print data creation device may be a device that prints print data which is created by itself (for example, a printer), or it may not be such a device. The print data creation device may comprise a first download device, a second download device, and a sending controller.

The first download device may perform a first task for downloading first data in predetermined data size units from an external device. Moreover, the first download device may download the first data by sending a download request from the first download device to the external device, or may cause the first data to be downloaded to a different controller (for example, the sending controller which is later described) by sending an instruction to that controller. The latter case is included in the term of 'the first download device downloading the first data'. Further, 'downloading the first data in predetermined data size units' means that the first data is partially downloaded in a small fraction at a time by sending a download request to the external device for a plurality of times. Moreover, the data size of the first data for each of the downloading need not necessarily be constant. That is, it is not necessary for the predetermined size to be constant. The data size of the first data may be changed for each downloading.

The second download device may download second data from the external device in accordance with an address of the second data in a case where the first data having the predetermined data size includes the address of the second data. The second data may be necessary for performing the second task. Moreover, the second download device may download the second data by sending a download request from the second download device to the external device, or may cause the second data to be downloaded to a different controller (for example, the sending controller which is later described) by sending an instruction to that controller. The latter case is included in the term of 'the second download device downloading the second data'. Moreover, the second download device may download the second data in predetermined data size units (i.e. the second data may be partially downloaded in a small fraction at a time), or a whole of the second data may be downloaded by one download request.

(1) The sending controller may prohibit a first download request for downloading the second data from being sent to the external device during the downloading of the first data having the predetermined data size. (2) The sending controller may prohibit a second download request for downloading the first data having the predetermined data size from being sent to the external device during the downloading of the second data. Moreover, as described above, the first download device may download the first data by sending the download request from the first download device to the external device. In this case, the first download device also functions as the sending controller for performing the above (2). Further, as described above, the second download device may download the second data by sending the download request from the second download device to the external device. In this case, the second download device also functions as the sending controller for performing the above (1). By contrast, the sending controller may send the download request in accordance with an instruction sent by the first download device and/or the second download device.

In the aforementioned configuration, the download request for downloading the second data is prohibited from being sent to the external device while the first data is being downloaded from that external device. The download request whose sending process has been prohibited may be sent to the external device after the download of the first data. The second data can consequently be downloaded reliably regardless of whether the external device corresponds to multiple connections. Further, in the aforementioned configuration, the download request for downloading the first data is prohibited from being sent to the external device while the second data is being downloaded from that external device. The download request whose sending process has been prohibited may be sent to the external device after the download of the second data. The first data can consequently be downloaded reliably regardless of whether the external device corresponds to multiple connections.

The technique taught in the present specification can be described as follows. This technique is a print data creation device for creating print data by performing a plurality of tasks including a first task and a second task in parallel. The print data creation device may comprise a first download device, a second download device, and a sending controller.

The first download device may download first data from an external device in accordance with an address of the first data. The first data may be necessary for performing the first task. The second download device may download second data from the external device in accordance with an address of the second data. The second data may be necessary for performing the second task. (1) The sending controller may prohibit a first download request for downloading the second data from being sent to the external device during the downloading of the first data. (2) The sending controller may prohibit a second download request for downloading the first data from being sent to the external device during the downloading of the second data. Moreover, the first download device and/or the second download device may download data by sending a download request from the first download device and/or the second download device to the external device, or may cause the data to be downloaded to a different controller (for example, the sending controller) by sending an instruction to that controller. Further, the first download device and/or the second download device may download the data in a partial unit at a time by sending a download request to the external device a plurality of times, or may download a whole of the data by sending a single download request.

In the aforementioned configuration, the download request for downloading the second data is prohibited from being sent to the external device while the first data is being downloaded from that external device. Further, in the aforementioned configuration, the download request for downloading the first data is prohibited from being sent to the external device while the second data is being downloaded from that external device. The first data and the second data can consequently be downloaded reliably even in a case where the external device does not correspond to multiple connections.

BRIEF DESCRIPTION OF THE DRAWINGS

FIG. 3 shows an example of a job creation request.
FIG. 4 shows an example of XHTML-Print data.
FIG. 6 shows an example of a style sheet file.
FIG. 12 shows an example of a session table.
FIG. 13 shows an example of a handle table.

DETAILED DESCRIPTION OF THE PREFERRED EMBODIMENT (Embodiment)

Figure 1:
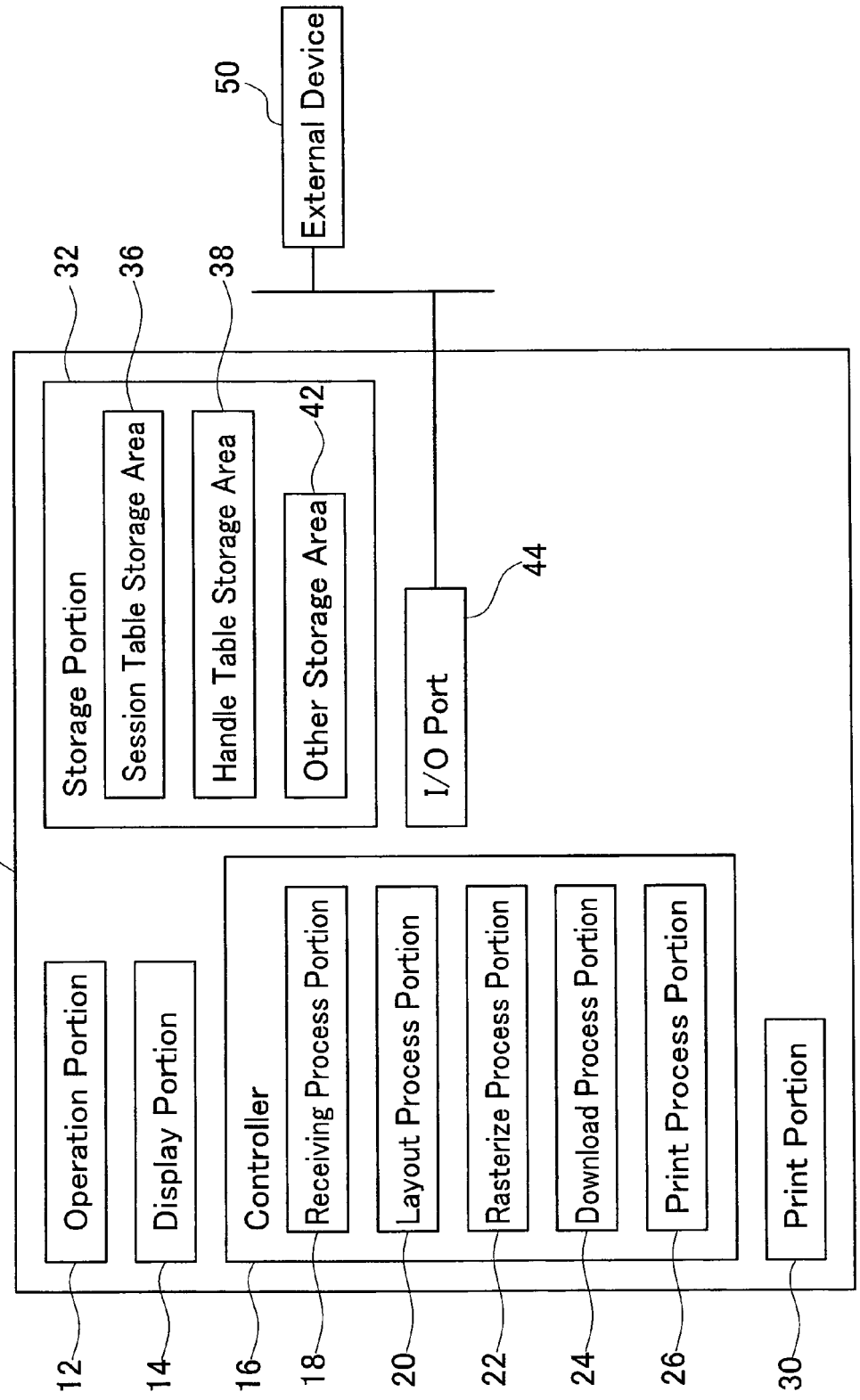
FIG. 1 shows the configuration of a printer system.

An embodiment will be described with reference to the figures. FIG. 1 shows a printer system 2 of the present embodiment. The printer system 2 comprises a printer 10, an external device 50, etc. The external device 50 is a device capable of instructing the printer 10 to perform printing (a device capable of sending a print job creation command). Examples of the external device 50 are, a personal computer, a digital camera, a television, a DVD recorder, and the like.

(Configuration of the Printer)

The printer 10 comprises an operation portion 12, a display portion 14, a controller 16, a print portion 30, a storage portion 32, an I/O port 44, etc. The operation portion 12 consists of a plurality of keys. The user can input information and instructions to the printer 10 by operating the operation portion 12. The display portion 14 is capable of displaying information.

The controller 16 consists of a CPU, etc. The controller 16 is capable of performing a plurality of tasks in parallel (simultaneously). The controller 16 may consist of one CPU, or may consist of a plurality of CPUs. The controller 16 is capable of performing a plurality of tasks in parallel with either of these configurations. The controller 16 comprises a receiving process portion 18, a layout process portion 20, a rasterize process portion 22, a download process portion 24, and a print process portion 26. The tasks of the process portions 18 to 26 are performed in parallel. The contents of the tasks performed by the process portions 18 to 26 will be described in detail below.

The print portion 30 prints on a print medium based on bit-mapped data created by the rasterize process portion 22 of the controller 16. The print portion 30 prints on the print medium in accordance with an instruction from the print process portion 26 of the controller 16. The storage portion 32 consists of a ROM, EEPROM, RAM, etc. The storage portion 32 has a session table storage area 36 and a handle table storage area 38. The contents of the information stored by the storage areas 36 and 38 will be described in detail below. Further, the storage portion 32 has a storage area 42 that stores programs for causing the controller 16 to perform tasks, data received from the exterior, data created by the controller 16, etc. The I/O port 44 is connected with a LAN circuit or an internet circuit. The printer 10 is capable of communicating with the external device 50 or another device (a device on the internet, etc.) via the I/O port 44.

(Receiving Process)

Figure 2:
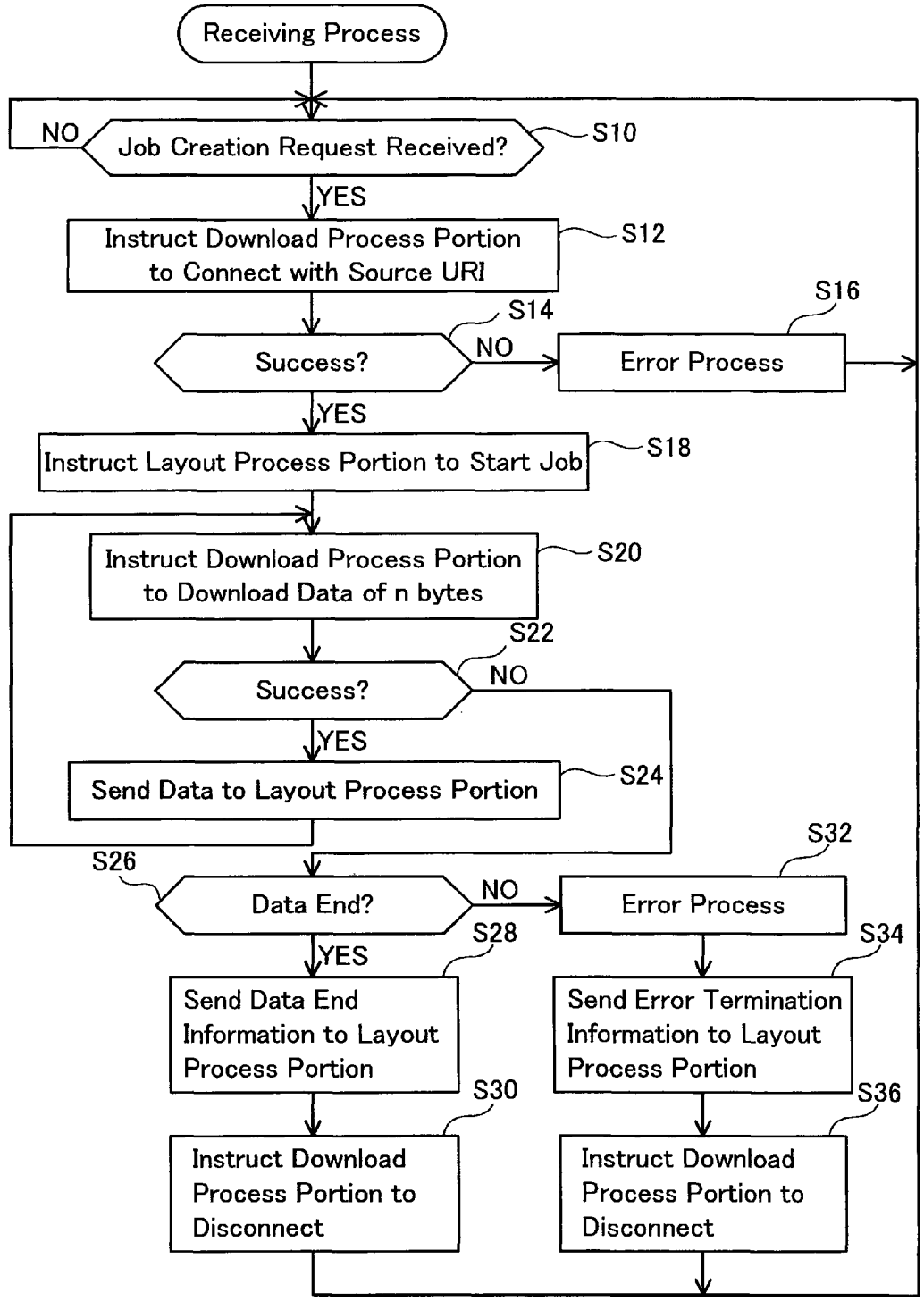
FIG. 2 shows a flowchart of a receiving process.

Next, the processes (tasks) performed by the process portions 18 to 26 of the controller 16 will be described. FIG. 2 shows a flowchart of the receiving process. The receiving process is performed by the receiving process portion 18 of the controller 16.

The receiving process portion 18 monitors whether a job creation request has been received (S10). For example, the external device 50 of FIG. 1 is capable of sending a job creation request to the printer 10. The job creation request is received by the printer 10 via the I/O port 44. In this case, determination in S10 is 'YES'. FIG. 3 shows an example of a job creation request. This job creation request 60 includes a source URI (Uniform Resource Identifier) 62. The source URI 62 is an address of data needed for printing (in the present embodiment, XHTML-Print data). Below, the XHTML-Print data may simply be termed "XHTML data". The source URI 62 includes an IP address of a device storing the XHTML data (in the present embodiment, the external device 50 of FIG. 1), a port number, and a file name of the XHTML data. In FIG. 3, "192.168.1.11" is the IP address, "1025" is the port number, and "a045f2el.xhtml" is the file name of the XHTML data.

Next, the receiving process portion 18 sends information instructing to establish a connection with the source URI (below this is termed "connection instruction") to the download process portion 24 (S12). In this process, the source URI 62 is sent to the download process portion 24. As a result, the download process portion 24 attempts to connect to the IP address included in the source URI 62 (attempts to establish a connection). In the case where connection was successful, the download process portion 24 sends a handle number to the receiving process portion 18. The handle number will be described in detail later. In the case where connection failed, the download process portion 24 sends error data to the receiving process portion 18. The receiving process portion 18 determines whether the connection has succeeded based on the data from the download process portion 24 (the handle number or the error data) (S14). In the case of 'NO' in S14, the receiving process portion 18 performs an error process (S16). In the case of 'YES' in S14, the process proceeds to S18.

In S18, the receiving process portion 18 sends information instructing to start a job (below this is termed "job start instruction") to the layout process portion 20. Then the receiving process portion 18 sends information instructing a predetermined number of bytes (n bytes in the present embodiment) of the XHTML data to be downloaded (below this is termed "download instruction") to the download process portion 24 (S20). The handle number sent from the download process portion 24 as the result of the process of S12 is added to the download instruction. The download process portion 24 downloads the XHTML data from the device with which the connection was established as the result of the process of S12. FIG. 4 shows an example of the XHTML data (XHTML-Print data). The XHTML data 70 includes a base address 72. Further, the XHTML data 70 includes a file name 72a of a style sheet file (which will later be described). A combination of the base address 72 and the file name 72a is the URL (Uniform Resource Locator) of the style sheet file. Further, the XHTML data 70 includes data 74 concerning an image data file. The XHTML data 70 of the present embodiment instructs four image data files to be printed. As a result, the XHTML data 70 includes four items of data 74 of the image data files. Each item of data 74 includes a file name 74a of the image data file. A combination of the base address 72 and the file name 74a is a URL of the image data file.

The download process portion 24 sends the downloaded XHTML data to the receiving process portion 18. Moreover, in the case where the XHTML data could not be downloaded correctly, the download process portion 24 sends error data to the receiving process portion 18. The receiving process portion 18 determines whether downloading has been successful based on the data (the XHTML data or the error data) from the download process portion 24 (S22). In the case where the data from the download process portion 24 is n bytes of XHTML data, the receiving process portion 18 determines 'YES' in S22. In this case, the receiving process portion 18 sends the XHTML data to the layout process portion 20 (S24). When S24 is completed, the receiving process portion 18 returns to S20, and sends the download instruction for downloading the next n bytes of XHTML data to the download process portion 24. Furthermore, the aforementioned handle number is also added to this download instruction.

In the case where the data from the download process portion 24 was less than n bytes of XHTML data, or was error data, the receiving process portion 18 determines 'NO' in S22. In the case where the data from the download process portion 24 was less than n bytes of XHTML data, the receiving process portion 18 determines that the XHTML data has been received through until the end, and determines 'YES' in S26. In this case, the receiving process portion 18 sends the XHTML data (the less than n bytes of XHTML data) to the layout process portion 20, and then sends information instructing that the data has ended (below this is termed "data end information") to the layout process portion 20 (S28). Next, the receiving process portion 18 sends information instructing that the connection be disconnected (below this is termed "disconnection instruction") to the download process portion 24 (S30). The handle number is added to the disconnection instruction. When S30 is completed, the process returns to S10.

In the case where the data from the download process portion 24 was error data, the receiving process portion 18 determines 'NO' in S26. In this case, the receiving process portion 18 performs an error process (S32). Next, the receiving process portion 18 sends information instructing that the process has been terminated with error process (below this is termed "error termination information") to the layout process portion 20 (S34). Next, the receiving process portion 18 sends the disconnection instruction to the download process portion 24 (S36). Furthermore, the handle number is also added to this disconnection instruction. When S36 is completed, the process returns to S10.

(Layout Process)

Figure 5:
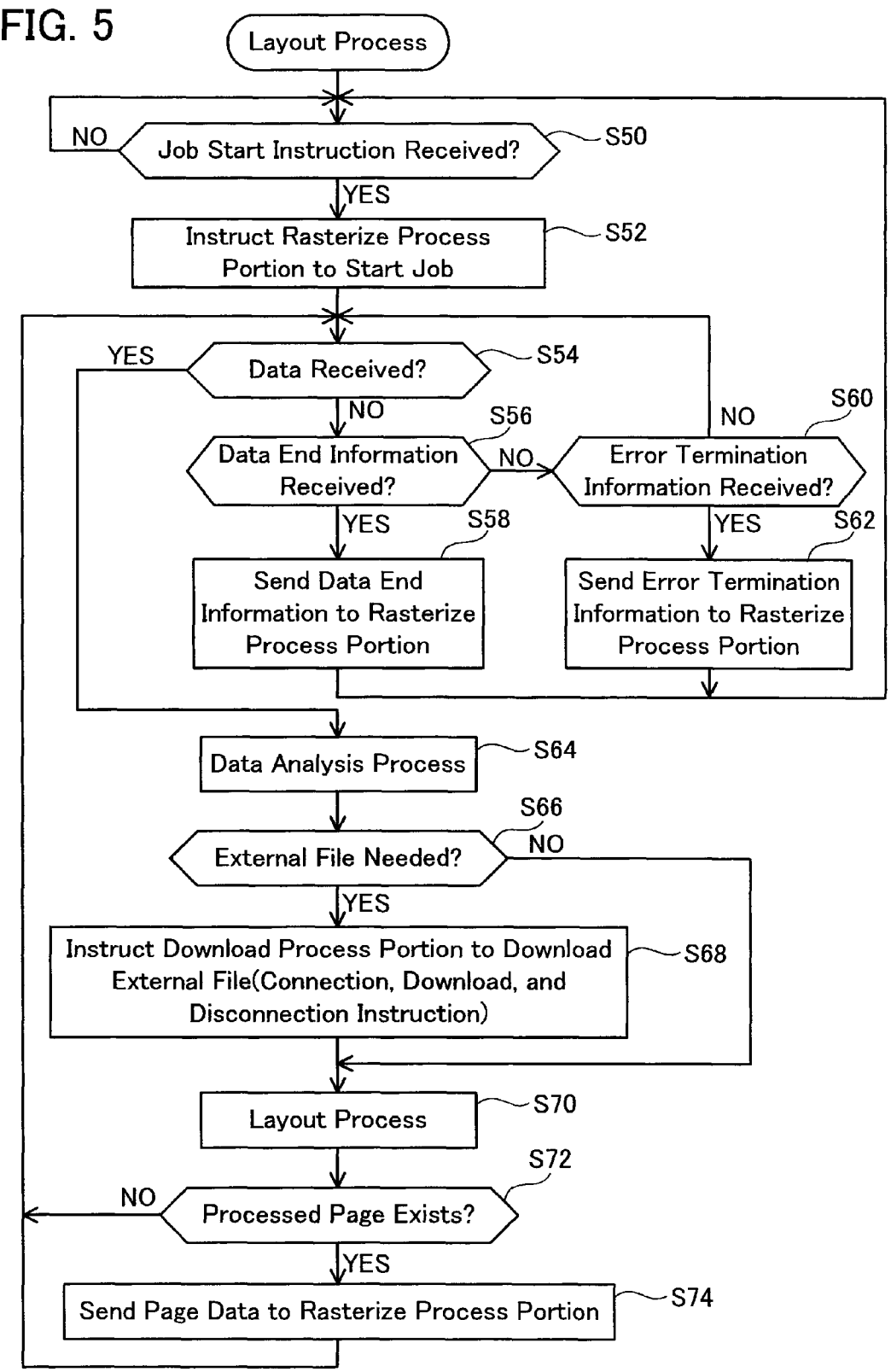
FIG. 5 shows a flowchart of a layout process.

Next, the layout process will be described. FIG. 5 shows a flowchart of the layout process. The layout process is performed by the layout process portion 20 of the controller 16.

The layout process portion 20 monitors whether the job start instruction has been received from the receiving process portion 18 (S50). The job start instruction is sent from the receiving process portion 18 to the layout process portion 20 in the process of S18 of FIG. 2. In the case of 'YES' in S50, the layout process portion 20 sends the job start instruction to the rasterize process portion 22 (S52). Then the layout process portion 20 monitors whether the XHTML data has been received from the receiving process portion 18 (S54). The XHTML data is sent from the receiving process portion 18 to the layout process portion 20 in the process of S24 of FIG. 2 (in the process of S28 in the case where this is the final XHTML data). In the case of 'YES' in S54, the process proceeds to S64. In the case of 'NO' in S54, the process proceeds to S56.

In S56, the layout process portion 20 monitors whether the data end information has been received from the receiving process portion 18. The data end information is sent from the receiving process portion 18 to the layout process portion 20 in the process of S28 of FIG. 2. In the case of 'YES' in S56, the layout process portion 20 sends the data end information to the rasterize process portion 22 (S58). When S58 is completed, the process returns to S50. In the case of 'NO' in S56, the layout process portion 20 monitors whether the error termination information has been received from the receiving process portion 18 (S60). The error termination information is sent from the receiving process portion 18 to the layout process portion 20 in the process of S34 of FIG. 2. In the case of 'YES' in S60, the layout process portion 20 sends the error termination information to the rasterize process portion 22 (S62). When S62 is processed, the process returns to S50. In the case of 'NO' in S60, the process returns to S54.

In S64, the layout process portion 20 performs a data analysis process. The layout process portion 20 creates data in which a plurality of image data file names is disposed in a series configuration in a memory (the storage area 42) by analyzing the XHTML data. Next, the layout process portion 20 determines whether it is necessary to download an external file (S66). Specifically, 'YES' is determined in S66 in the case where the style sheet file URL 72, 72a (see FIG. 4) is included in the XHTML data 70 received in S54. In this case, the layout process portion 20 instructs the download process portion 24 to download the file (style sheet file) specified by the URL 72, 72a (S68). Specifically, the layout process portion 20 sends the connection instruction, the download instruction, and the disconnection instruction to the download process portion 24. The style sheet file URL 72, 72a (the IP address, the port number, the file name, etc.) is added to the connection instruction. In the case where the handle number has been sent from the download process portion 24 as a result of the connection instruction, the layout process portion 20 sends the download instruction to the download process portion 24. The handle number is added to the download instruction. In the case where the style sheet file or the error data has been sent from the download process portion 24 as a result of the download instruction, the layout process portion 20 sends the disconnection instruction to the download process portion 24. Here, the handle number is added to the disconnection instruction. As long as no error occurs, the layout process portion 20 is capable of obtaining the style sheet file by performing the process of S68.

FIG. 6 shows an example of a style sheet file. The style sheet file 80 includes data 82 for specifying the position of each item of image data. The XHTML data 70 of the present embodiment instructs four items of image data to be printed (see FIG. 4). As a result, the data 82 includes data corresponding to each of the four items of image data. Further, the style sheet file 80 includes data 84 for specifying the rotation angle of each of the four items of image data. The layout process portion 20 analyzes the style sheet file 80, and specifies the layout (the coordinates in which the image data is to be located) for each of the items of image data from the data 82 and the data 84 (S70). In the data 82 of the present embodiment, the position of each of the items of image data within the printing page is described in detail. As a result, the layout process portion 20 is capable of specifying the layout of each of the items of image data by reading the data 82. Moreover, the XHTML data 70 may include data capable of specifying the layout without an external file being downloaded. In the process of S70, which is performed when 'NO' is determined in S66, the layout process portion 20 specifies the layout from data described in the XHTML data 70 of which expresses the layout.

The layout process portion 20 determines whether a page exists for which the layout has been determined (S72). In the case of 'YES' in S72, the layout process portion 20 sends data including the layout of the image data to the rasterize process portion 22 (S74). Below, this data will be termed "page data". The page data includes the URLs 72 and 74a (see FIG. 4) of the image data. Moreover, in the case of 'NO' in S72, S74 is skipped. In the case of 'NO' in S72, or in the case where S74 has been completed, the layout process portion 20 returns to S54, and monitors whether the next XHTML data 70 has been received.

(Rasterize Process)

Figure 7:
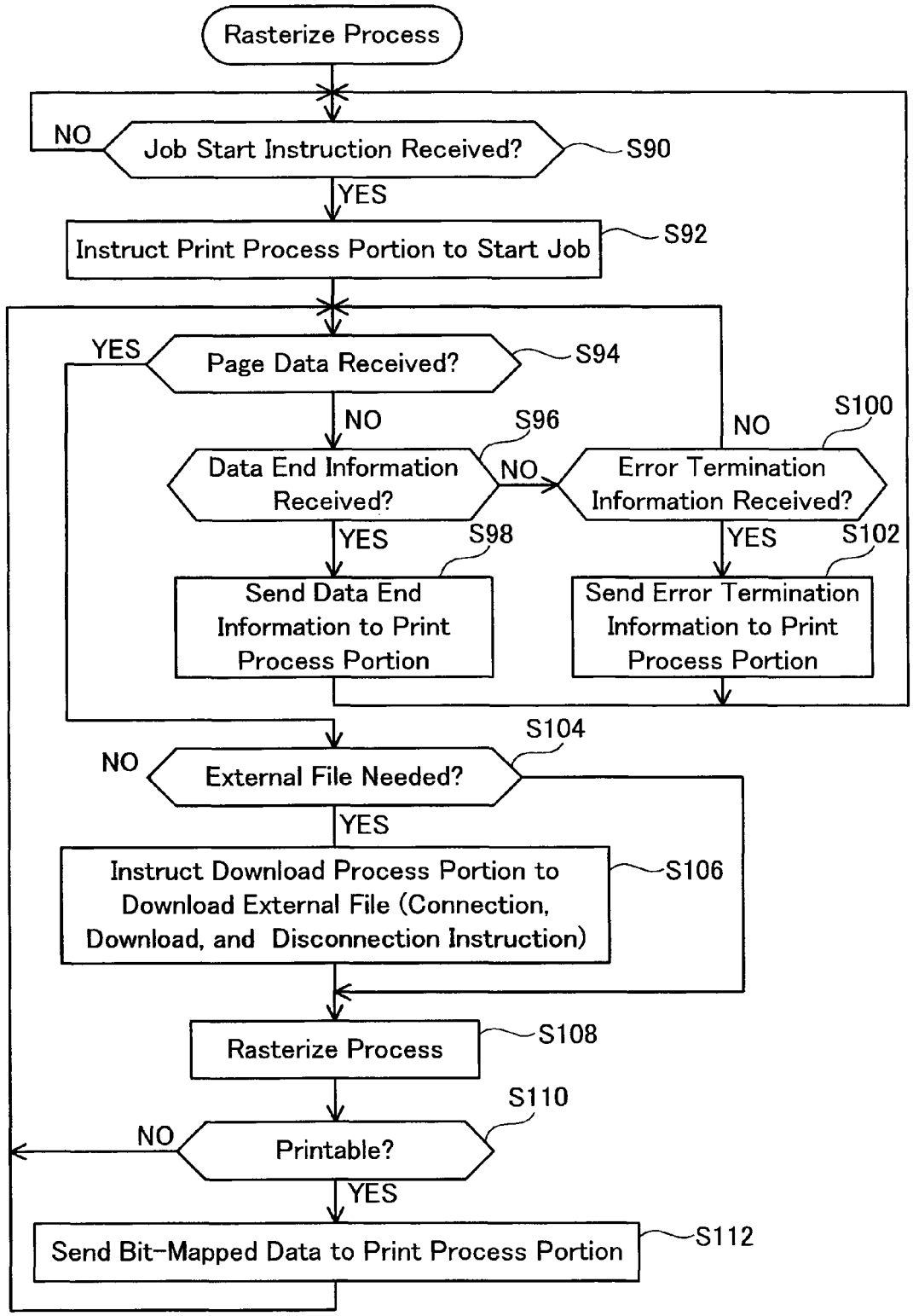
FIG. 7 shows a flowchart of a rasterize process.

Next the rasterize process will be described. FIG. 7 shows a flowchart of the rasterize process. The rasterize process is performed by the rasterize process portion 22 of the controller 16.

The rasterize process portion 22 monitors whether the job start instruction has been received from the layout process portion 20 (S90). The job start instruction is sent from the layout process portion 20 to the rasterize process portion 22 in the process of S52 of FIG. 5. In the case of 'YES' in S90, the rasterize process portion 22 sends the job start instruction to the print process portion 26 (S92). Next, the rasterize process portion 22 monitors whether the page data has been received from the layout process portion 20 (S94). The page data is sent from the layout process portion 20 to the rasterize process portion 22 in the process of S74 of FIG. 5. In the case of 'YES' in S94, the process proceeds to S104. Moreover, in the present embodiment, the rasterize process portion 22 does not determine 'YES' in S94 after all of the page data for one page has been received, but instead, it determines 'YES' when a predetermined amount of page data has been partially received. As a result, the rasterize process portion 22 performs the process from S104 several times for the one page. Moreover, in the case of 'NO' in S94, the process proceeds to S96.

In S96, the rasterize process portion 22 monitors whether the data end information has been received from the layout process portion 20. The data end information is sent from the layout process portion 20 to the rasterize process portion 22 in the process of S58 of FIG. 5. In the case of 'YES' in S96, the rasterize process portion 22 sends the data end information to the print process portion 26 (S98). When S98 is completed, the process returns to S90. In the case of 'NO' in S96, the rasterize process portion 22 monitors whether the error termination information has been received from the layout process portion 20 (S100). The error termination information is sent from the layout process portion 20 to the rasterize process portion 22 in the process of S62 of FIG. 5. In the case of 'YES' in S100, the rasterize process portion 22 sends the error termination information to the print process portion 26 (S102). When S102 ends, the process returns to S90. In the case of 'NO' in S100, the process returns to S94.

In S104, the rasterize process portion 22 determines whether it is necessary to download an external file. Specifically, 'YES' is determined in S104 in the case where at least one item of the image data URL 72, 74a is included in the page data received in S94. In this case, the rasterize process portion 22 instructs the download process portion 24 to download the file (the image data file) specified by the URL 72, 74a included in the page data (S106). Specifically, the rasterize process portion 22 sends the connection instruction, the download instruction, and the disconnection instruction to the download process portion 24. The image data file URL 72, 74a (the IP address, the port number, the file name, etc.) is added to the connection instruction. In the case where the handle number has been sent from the download process portion 24 as a result of the connection instruction, the rasterize process portion 22 sends the download instruction to the download process portion 24. The handle number is added to the download instruction. In the case where the image data file or the error data has been sent from the download process portion 24 as a result of the download instruction, the rasterize process portion 22 sends the disconnection instruction to the download process portion 24. The handle number is added to the disconnection instruction. As long as no error should occur, the rasterize process portion 22 is capable of obtaining the image data file by performing the process of S106.

The rasterize process portion 22 analyzes the image data file, and performs a process to rasterize the image data included in the image data file (S108). Bit-mapped data is thereby created. Moreover, data that must be rasterized (for example, text data) may be included in the page data even when an external file is not downloaded. In the process of S108 that is performed when 'NO' is determined in S104, the rasterize process portion 22 rasterizes this type of data that is included in the page data.

The rasterize process portion 22 determines whether one band of bit-mapped data has been created (S110). A repeating method has been adopted in the present embodiment in which one band of bit-mapped data is created and this bit-mapped data is printed on a print medium. That is, the printer 10 of the present embodiment prints on the print medium in band units. The unit "band" refers, for example, to an area that can be printed by one scan of an ink jet head. In the case of 'YES' in S110, the rasterize process portion 22 sends one band of bit-mapped data to the print process portion 26 (S112). Moreover, in the case of 'NO' in S110, S112 is skipped. In the case of 'NO' in S110, or in the case where S112 has terminated, the rasterize process portion 22 returns to S94 and monitors whether the next page data has been received.

(Download Process)

Figure 8:
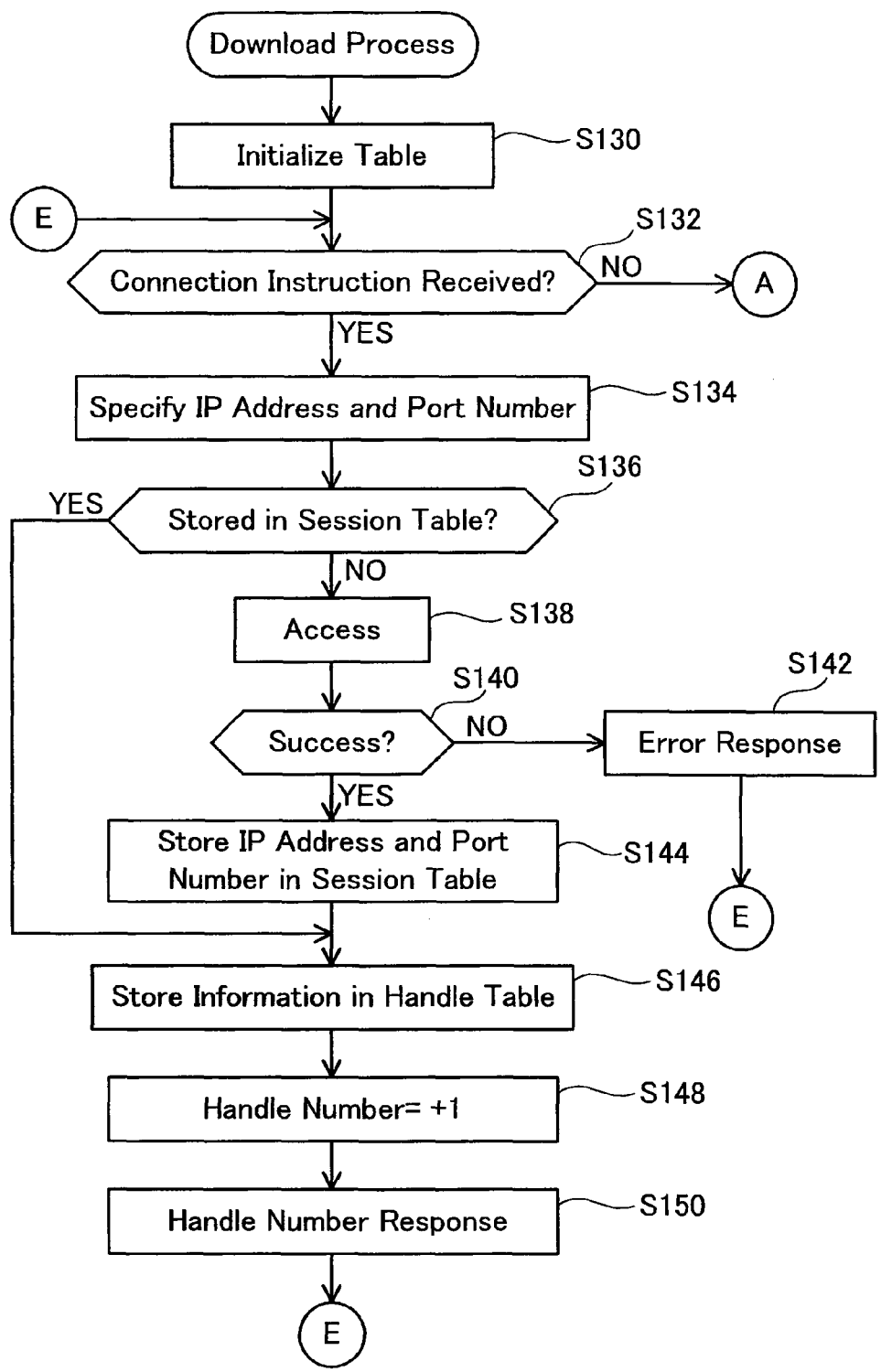
FIG. 8 shows a flowchart of a download process.
Figure 9:
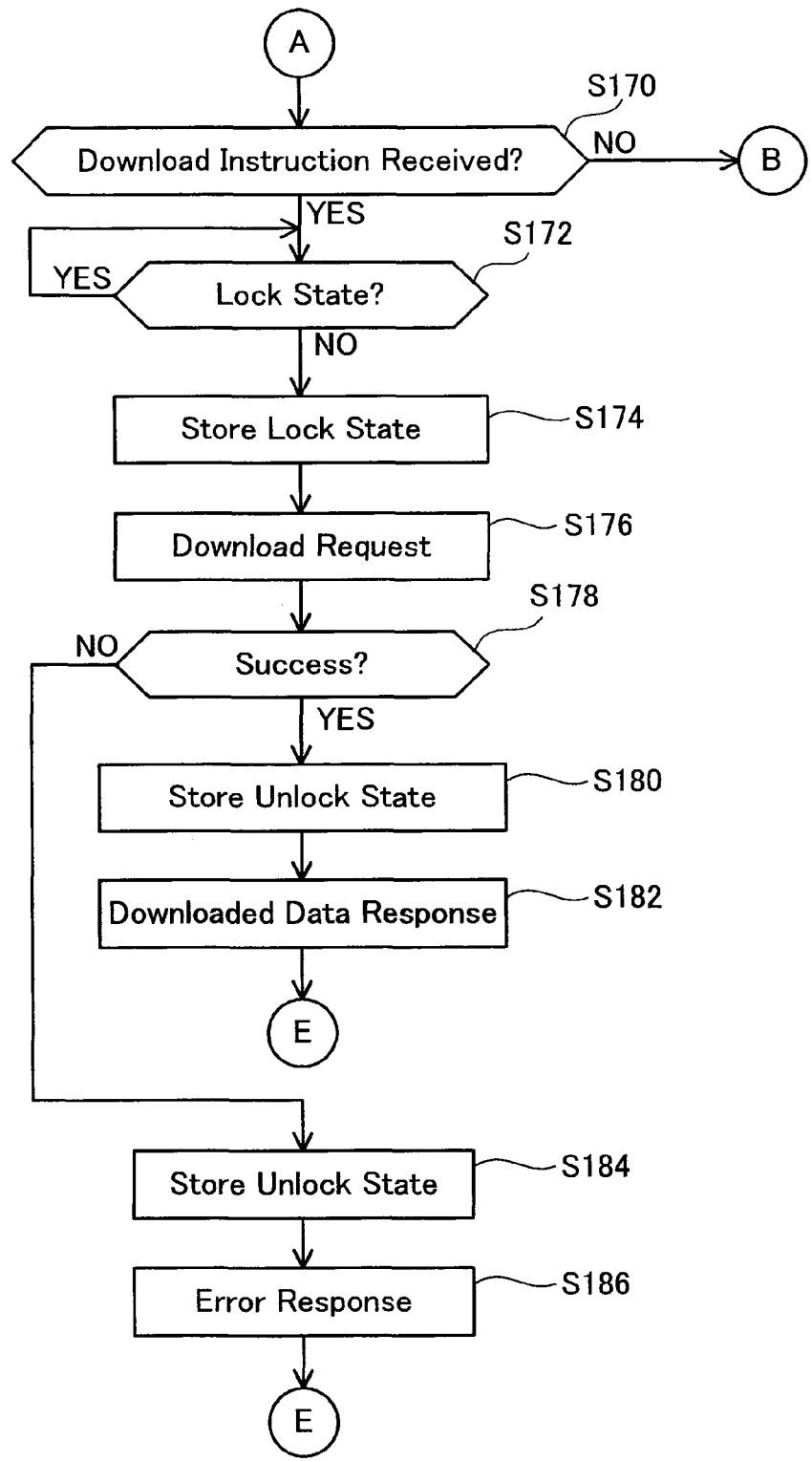
FIG. 9 shows a continuation of the flowchart of FIG. 8.
Figure 10:
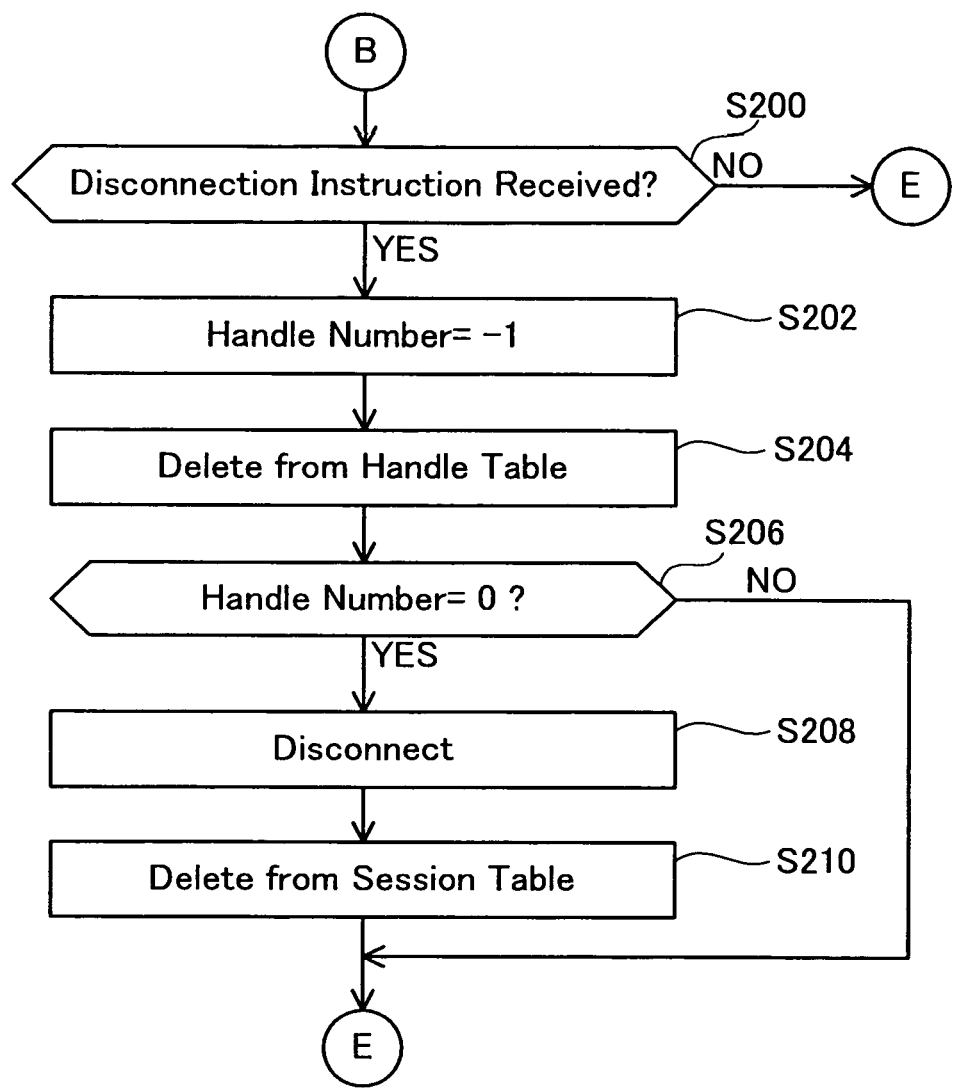
FIG. 10 shows a continuation of the flowchart of FIG. 9.

Next, the download process will be described. FIGS. 8 to 10 show a flowchart of the download process. The download process is performed by the download process portion 24 of the controller 16. Although this will be described in detail later, the download process portion 24 performs the process of FIG. 8 in accordance with the connection instruction from the process portions 18, 20, and 22, performs the process of FIG. 9 in accordance with the download instruction, and performs the process of FIG. 10 in accordance with the disconnection instruction. Other connection instruction can be sent to the download process portion 24 while the download process portion 24 is performing the process of FIG. 8 in accordance with the connection instruction. In this case, the download process portion 24 is capable of performing the process of FIG. 8 in parallel in accordance with the respective connection instructions. Similarly, the download process portion 24 is capable of performing the process of FIG. 9 in parallel in accordance with each of a plurality of download instructions, and is capable of performing the process of FIG. 10 in parallel in accordance with each of a plurality of disconnection instructions. Further, the download process portion 24 is capable of performing the processes of FIG. 8, FIG. 9, and FIG. 10 in parallel.

The download process portion 24 first initializes the session table storage area 36 and the handle table storage area 38 (see FIG. 1) (S130). Next, the download process portion 24 monitors whether the connection instruction has been received (S132). This connection instruction is sent to the download process portion 24 by the process portions 18, 20, or 22 in the process of S12 of FIG. 2, the process of S68 of FIG. 5, or the process of S106 of FIG. 7. The IP address and the port number (see for example, the data 62 of FIG. 3) are included in the connection instruction. In the case of 'YES' in S132, the download process portion 24 specifies the IP address and the port number included in the connection instruction (S134). Next, the download process portion 24 determines whether a combination of the IP address and the port number specified in S134 is already stored in the session table (S136).

The session table will be described prior to describing the process of S136. FIG. 12 shows an example of a session table stored in the session table storage area 36. The session table 100 stores data 120 in which a session number 102, an IP address 104, a port number 106, a handle number 108, and a state 110 are associated. Moreover, the data 120 may hereinafter be termed "session combination data". In the example of FIG. 12, three items of session combination data 120 are present. The value of either state of being locked (lock state) or being unlocked (unlock state) is written into the respective columns of the state 110.

In the process of S136 of FIG. 8, the download process portion 24 determines whether the combination of IP address and port number specified in S134 has already been stored in the session table by referring to the session table 100. In the case of 'YES' in S136, the processes of S138 to S144 (which will be described later) are skipped, and the process proceeds to S146. In the case of 'NO' in S136, the download process portion 24 attempts to establish a connection with the IP address and port number specified in S134 (S138). That is, the download process portion 24 sends a signal for establishing a connection. The download process portion 24 determines whether connection has been successful by monitoring a response to this signal (S140). In the case of 'NO' in S140, the download process portion 24 sends an error data response to the process portion (i.e., any of the receiving process portion 18, the layout process portion 20, or the rasterize process portion 22) that had sent the connection instruction that was received in S132 (S142). When S142 is completed, the process returns to S132.

In the case of 'YES' in S140, the download process portion 24 stores the IP address and the port number identified in S134 in the session table 100 (S144). New session combination data 120 is thus added to the session table 100. In the session combination data 120 added in S144, "0" is adopted as the handle number 108, and "unlock state" is adopted as the state 110. Next, the download process portion 24 stores information in the handle table (S146).

The handle table will be described prior to describing the process of S146. FIG. 13 shows an example of a handle table stored in the handle table storage area 38. The handle table 130 stores data 140 in which a handle number 132, a session number 134, a URL 136, and a state 138 are associated. Moreover, the data 140 may hereinafter be termed "handle combination data". In the example of FIG. 13, five items of handle combination data 140 are present. The value of either state of waiting (wait state) or downloading (downloading state) is written into the respective columns of the state 138.

In the process of S146 of FIG. 8, the download process portion 24 writes a new handle number into the handle table 130, this new handle number being obtained by adding "1" to the handle number 132 that is currently the largest. For example, in FIG. 13 the largest handle number 132 is "5". In this case, the download process portion 24 writes a new handle number "6" into the handle table 130. Further, the download process portion 24 identifies the session number stored in the session table 100 that is associated with the IP address and the port number specified in S134, and writes this identified session number into the handle table 130. In the above example, the session number is written that is associated with the new handle number "6". Further, the download process portion 24 writes the URL (IP address, port number, and file name) included in the connection instruction received in S132 into the handle table 130. In the above example, the URL is written that is associated with the new handle number "6". Moreover, "wait state" is adopted as the state 138 in this step. New handle combination data 140 is added to the handle table 130 by performing the process of S146.

Next, the download process portion 24 changes the contents of the session table 100 (S148). Specifically, the download process portion 24 adds "1" to the handle number 108 associated with the session number (i.e. the session number associated with the IP address and the port number specified in S134) specified in S146. Next, the download process portion 24 sends the new handle number determined in S146 as a response to the process portion (i.e., any of the receiving process portion 18, the layout process portion 20, and the rasterize process portion 22) that had sent the connection instruction received in S132 (S150). When S150 is terminated, the process returns to S132.

Next, the process after 'NO' is determined in S132 of FIG. 8 will be described. In the case of 'NO' in S132, the process proceeds to S170 of FIG. 9. In S170, the download process portion 24 monitors whether the download instruction has been received. The download instruction is sent from the process portion 18, 20, or 22 to the download process portion 24 in the process of S20 of FIG. 2, the process of S68 of FIG. 5, or the process of S106 of FIG. 7 respectively. The handle number is included in the download instruction. In the case of 'YES' in S170, the download process portion 24 specifies the session number being stored in the handle table 130 that is associated with the handle number included in the download instruction. For example, in the case where the handle number received in S170 is the number "3" of FIG. 13, the download process portion 24 specifies the session number "2". Next, the download process portion 24 specifies the state 110 being stored in the session table 100 that is associated with the specified session number. In the case of the above example, the download process portion 24 specifies the "lock state" (see FIG. 12) that is associated with the session number "2". In the case where "lock state" is specified, the download process portion 24 determines 'YES' in S172. In this case, the download process portion 24 waits until the "lock state" is deleted. In the case where "unlock state" is specified, the download process portion 24 determines 'NO' in S172. In this case, the process proceeds to S174.

In S174, the download process portion 24 changes the contents of the session table 100. Specifically, the download process portion 24 changes the state 110 associated with the session number (the session number associated with "unlock state") specified in S172 from "unlock state" to "lock state". Next, the download process portion 24 attempts to download the file from the URL 136 stored in the handle table 130 associated with the handle number received in S170 (S176). Specifically, the download process portion 24 sends an instruction (may hereinafter be termed a "download request instruction") to send the file specified from the URL 136 to the device (e.g., the external device 50 of FIG. 1) specified from the URL 136. Moreover, the download process portion 24 also changes the state 138 stored in the handle table 130 associated with the handle number received in S170 from "wait state" to "downloading state" in the process of S176.

As long as no error should occur, a data file (XHTML data, a style sheet file, or an image data file) is downloaded from the exterior by performing the process of S178. In the case where the downloading has been performed correctly, the download process portion 24 determines 'YES' in S178. In this case, the download process portion 24 changes the state 110 of the session combination data 120, which had once been changed to "lock state" in S174, back to "unlock state" (S180). Furthermore, the download process portion 24 sends the downloaded data file to the process portion (i.e., any of the receiving process portion 18, the layout process portion 20, or the rasterize process portion 22) that had sent the download instruction that was received in S170 (S182). When S182 is completed, the process returns to S132 of FIG. 8.

In the case where downloading has not been performed correctly, the download process portion 24 determines 'NO' in S178. In this case also, the download process portion 24 changes the state 110 of the session combination data 120, which had been changed to "lock state" in S174, back to "unlock state" (S184). Furthermore, the download process portion 24 sends the error data to the process portion (any of the receiving process portion 18, the layout process portion 20, or the rasterize process portion 22) that had sent the download instruction that was received in S170 (S186). When S186 is completed, the process returns to S132 of FIG. 8.

Next, the process after 'NO' is determined in S170 of FIG. 9 will be described. In the case of 'NO' in S170, the process proceeds to S200 of FIG. 10. In S200, the download process portion 24 monitors whether the disconnection instruction has been received. The disconnection instruction is sent from the process portion 18, 20, or 22 to the download process portion 24 in the process of S30 or S36 of FIG. 2, the process of S68 of FIG. 5, or the process of S106 of FIG. 7 respectively. The handle number is included in the disconnection instruction. In the case of 'NO' in S200, the process returns to S132 of FIG. 8. In the case of 'YES' in S200, the download process portion 24 specifies the session number being stored in the handle table 130 that is associated with the handle number included in the disconnection instruction. Next, the download process portion 24 subtracts "1" from the handle number 108 being stored in the session table 100 that is associated with the specified session number. For example, in the case of the session number "2" of the session combination data 120 in the example of FIG. 12, the handle number 108 is changed from "3" to "2".

Next, the download process portion 24 deletes from the handle table 130 the handle combination data 140 that includes the handle number included in the disconnection instruction received in S200 (S204). Then the download process portion 24 determines whether the handle number 108 is "0" of the session combination data 120 in which the subtraction of the handle number was performed in S202 (S206). In the case of 'NO' in S206, the download process portion 24 skips S208 and S210 (to be described), and returns to S132 of FIG. 8. In the case of 'YES' in S206, the download process portion 24 disconnects the connection (S208). Specifically, the download process portion 24 sends a signal to disconnect the connection to the URL 104, 106 of the session combination data 120 in which the subtraction of the handle number was performed in S202 (the session combination data 120 in which the handle number is "0"). Then the download process portion 24 deletes the aforementioned session combination data 120 (the session combination data 120 in which the handle number is "0") from the session table 100 (S210). When S210 is completed, the process returns to S132 of FIG. 8.

(Print Process)

Figure 11:
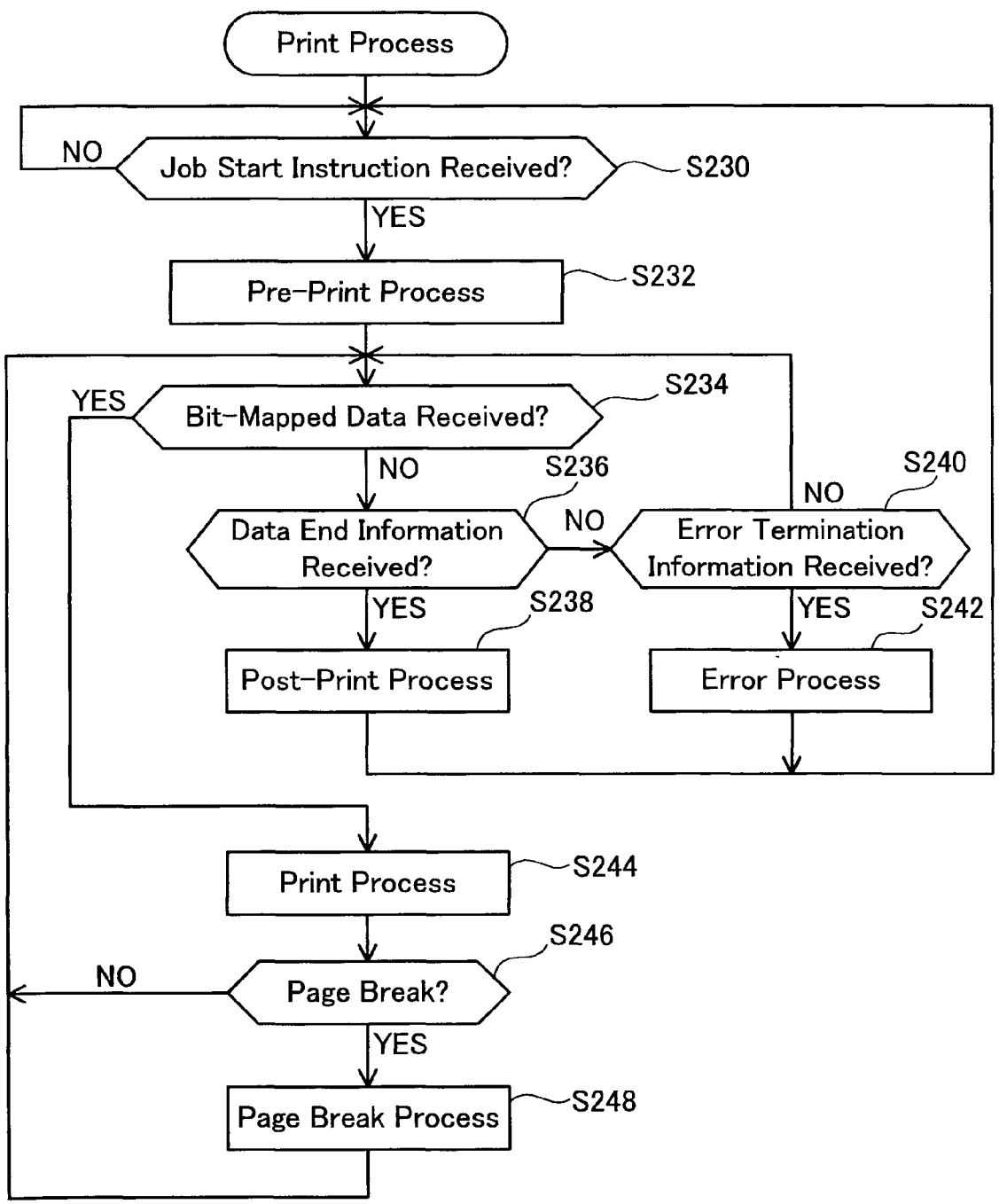
FIG. 11 shows a flowchart of a print process.

Next, the print process will be described. FIG. 11 shows a flowchart of the print process. The print process is performed by the print process portion 26 of the controller 16.

The print process portion 26 monitors whether the job start instruction has been received from the rasterize process portion 22 (S230). The job start instruction is sent from the rasterize process portion 22 to the print process portion 26 in the process of S92 of FIG. 7. In the case of 'YES' in S230, the print process portion 26 performs a pre-print process that is executed prior to printing (S232). For example, the print process portion 26 performs a process to transport a print medium that is being housed in a feed tray along a transport path. Next, the print process portion 26 monitors whether bit-mapped data has been received from the rasterize process portion 22 (S234). The bit-mapped data is sent from the rasterize process portion 22 to the print process portion 26 in the process of S112 of FIG. 7. In the case of 'YES' in S234, the process proceeds to S244. In the case of 'NO' in S234, the process proceeds to S236.

In S236, the print process portion 26 monitors whether the data end information has been received from the rasterize process portion 22. The data end information is sent from the rasterize process portion 22 to the print process portion 26 in the process of S98 of FIG. 7. In the case of 'YES' in S236, the print process portion 26 performs a post-print process that is executed subsequent to printing (S238). For example, the print process portion 26 performs a process to transport the print medium that has been printed toward a discharge tray. When S238 is completed, the process returns to S230. In the case of 'NO' in S236, the print process portion 26 monitors whether the error termination information has been received from the rasterize process portion 22 (S240). The error termination information is sent from the rasterize process portion 22 to the print process portion 26 in the process of S102 of FIG. 7. In the case of 'YES' in S240, the print process portion 26 performs an error process (S242). For example, the print process portion 26 performs a process to transport the print medium toward the discharge tray or a process to display an instruction showing error on the display portion 14 (see FIG. 1). When S242 is completed, the process returns to S230. In the case of 'NO' in S240, the process returns to S234.

In S244, the print process portion 26 performs the print process. Specifically, the print process portion 26 drives the print portion 30 (see FIG. 1) based on the bit-mapped data received in S234. Next, the print process portion 26 determines whether the printing of one page of the print medium has been completed (S246). In the case of 'NO' in S246, S248 (which will be described later) is skipped, and the process returns to S234. In the case of 'YES' in S246, the print process portion 26 performs a process to transport the next page of the print medium (S248). When S248 is completed, the process returns to S234.

The printer system 2 of the present embodiment has been described in detail. The printer 10 performs the receiving process, the layout process, the rasterize process, the download process, and the print process in parallel (simultaneously). That is, the printer 10 performs two or more of the aforementioned tasks in parallel. The bit-mapped data can consequently be created more rapidly than in the case where the tasks are performed in series. For example, the bit-mapped data can be created more rapidly than in the case where the layout task or the rasterize task is performed after the task of receiving the whole of the XHTML data 70 has ended, and in the case where the rasterize task is performed after the layout task for all the pages has ended. For example, the print process takes time in a type of printer that prints in band units, such as an ink jet type printer. By performing a plurality of tasks in parallel, as in the present embodiment, the print process can start from the print data that has just been created, the time at which printing starts thus becomes earlier, and the waiting time from the user instructing printing until the obtainment of the printed article thus becomes shorter. Since the plurality of tasks is performed in parallel, such technique simply requires storing the data needed for performing each task. As a result, it is not necessary to store all of the data required to create the whole print data in the printer 10, and consequently the amount of stored contents can be reduced.

The printer 10 downloads the XHTML data 70 by employing the receiving process (the receiving task), downloads the style sheet file 80 by employing the layout process (the layout task), and downloads the image date file by employing the rasterize process (the rasterize task). The downloading of an aimed data is allowed only in the case where other data is not being downloaded from the same external device 50. That is, the download request instruction for downloading other data is prohibited from being sent to the external device 50 while the aimed data is being downloaded from the same external device 50. All the data can therefore be downloaded reliably and orderly even in the case where the external device 50 does not correspond to multiple connections. Further, since a plurality of items of data can be obtained by application of one session, it is possible to create the print data efficiently.

Some of the technique taught in the above embodiment will be listed below. The print data creation device may further comprise a receiving device for receiving a print job creating request including an address of the first data. In this case, the first download device may download the first data from the external device in accordance with the address included in the print job creating request.

As described above, the first download device and the second download device may each also function as the sending controller. Alternatively, the sending controller may download the data in accordance with an instruction from each of the first download device and the second download device. This configuration can be described as follows. That is, the first download device may instruct the sending controller to download the first data that has the predetermined data size. Further, the second download device may instruct the sending controller to download the second data. In the former case, the sending controller may send the second download request in accordance with the instruction from the first download device. Similarly in the latter case, the sending controller may send the first download request in accordance with the instruction from the second download device.

The second data may be image data. In this case, the second download device may perform the second task for creating print data by rasterizing the second data. Alternatively, the second data may be another type of data (for example, data concerning a layout which is later described). In this case, the second download device may perform the second task for performing a process other than rasterizing.

The first data may include an address of third data concerning a layout of the image data. In this case, the print data creation device may further comprise a third download device for downloading the third data from the external device in accordance with the address of the third data in a case where the first data having the predetermined data size includes the address of the third data. The third data may be necessary for performing a third task. Moreover, the third download device may download the third data by sending a download request from the third download device to the external device, or may cause the third data to be downloaded to a different controller (for example, the sending controller) by sending an instruction to that controller. The latter case is included in the term of 'the third download device downloading the third data'. Moreover, the third download device may download the third data in predetermined data size units (i.e. the third data may be partially downloaded in a small fraction at a time), or a whole of the third data may be downloaded by means of one download request.

In the case of the aforementioned configuration, the sending controller may operate as follows. That is, the sending controller may prohibit a third download request for downloading the third data from being sent to the external device during the downloading of the first data having the predetermined data size or during the downloading of the second data. Further, the sending controller may prohibit the first download request and the second download request from being sent to the external device during the downloading of the third data. In this configuration, the download request for downloading the third data is prohibited from being sent to the external device while the first data or the second data is being downloaded from the same external device. Further, in this configuration, the download request for downloading the first data or the second data is prohibited from being sent to the external device while the third data is being downloaded from the same external device. In either case, the download request for one of the first, second and third data that had been prohibited due to the download of other data may be sent to the external device after the currently performed download. All the data can consequently be downloaded reliably even in the case where the external device does not correspond to multiple connections.

In the case of the above configuration, the third download device may perform the third task for determining the layout of the image data based on the third data. Moreover, the manner in which the third download device determines the layout may be present in the contents of the third data. For example, it may be necessary to perform a calculation based on the contents of the third data in order to determine the layout. In this case, the third download device may determine the layout by performing a calculation based on the third data. Alternatively, there also may be a case in which the layout is determined merely by reading the third data. In this case, the third download device may determine the layout by reading the third data. Moreover, in the case where the configuration is adopted in which the third download device determines the layout, the second download device may create the print data in which the image data is laid out in accordance with the layout determined by the third download device.

The external device may be specified by an IP address. Alternatively, the external device may be specified by a combination of an IP address and a port number. In this case, when a plurality of ports is utilized in one device, it may be understood as a plurality of external devices is present within that device.

The print data creation device may further comprise a download information storage that stores an association of the aforementioned combination and download information indicating whether data is currently being downloaded from the combination. In this case, the sending controller can determine whether data is currently being downloaded from the external device based on the stored contents of the download information storage.

A computer readable medium including a computer program also has utility for realizing the print data creation device. The computer program may include instructions for ordering a computer to carry out the processes below:

(1) Perform a first task for downloading first data in predetermined data size units from an external device.

(2) Download second data from the external device in accordance with an address of the second data in a case where the first data having the predetermined data size includes the address of the second data. The second data may be necessary for performing a second task.

(3) Prohibit a first download request for downloading the second data from being sent to the external device during the downloading of the first data having the predetermined data size; and (4) Prohibit a second download request for downloading the first data having the predetermined data size from being sent to the external device during the downloading of the second data.

When this computer program is utilized, a device for reliably downloading the first data and the second data can be realized.

Further, the following computer readable medium including a computer program is also beneficial. This computer program may include instructions for ordering a computer to carry out the processes below:

(1) Download first data from an external device in accordance with an address of the first data. The first data may be necessary for performing a first task.

(2) Download second data from the external device in accordance with an address of the second data. The second data may be necessary for performing a second task.

(3) Prohibit a first download request for downloading the second data from being sent to the external device during the downloading of the first data.

(4) Prohibit a second download request for downloading the first data from being sent to the external device during the downloading of the second data.

When this computer program is utilized, a device can be realized for reliably downloading the first data and the second data.

(1) The print data creation device taught in the embodiment can be described as follows. The print data creation device may create print data by performing a plurality of tasks in parallel. The print data creation device may create the print data based on a plurality of data files. The print data creation device may comprise an address receiving device for receiving an address of each of the plurality of data files. Further, the print data creation device may comprise a sending controller for downloading the data files from a source in accordance with the addresses. The sending controller may be prohibited from sending download requests in parallel to the same external device. The term "prohibited from sending download requests in parallel to the same external device" means that the sending of a download request to the external device is prohibited while data is being downloaded from that external device.

(2) The data concerning the layout of the image data may include data for specifying the position of the image data and/or data for specifying the rotation angle of the image data.

(3) The print data creation device may comprise a layout process portion and a download process portion. The layout process portion may determine whether it is necessary to download an external file. The layout process portion may instruct the download process portion to download the external file. This instruction may include a connection instruction, a download instruction, and a disconnection instruction. The connection instruction may include at least an IP address and a file name of the external file. The download process portion may be made to store the IP address included in the connection instruction in a first table. The download process portion may be made to store a combination of the IP address and the file name included in the connection instruction (hereinafter simply referred to as "combination") in a second table. An identification number (or code) may be added to this combination. The download process portion may send the identification number to the layout process portion. The layout process portion may send the download instruction or the disconnection instruction including the identification number to the download process portion. The download process portion may download the external file in accordance with the combination stored in the second table that is associated with the identification number included in the download instruction. The download process portion may delete the combination stored in the second table that is associated with the identification number included in the disconnection instruction.

(4) The print data creation device may comprise a rasterize process portion and the download process portion. The rasterize process portion may determine whether it is necessary to download an external file. The rasterize process portion may instruct the download process portion to download the external file. This instruction may include a connection instruction, a download instruction, and a disconnection instruction. The download process portion may operate identically to the case of the above (3).

The above embodiment is a mere example, and various modifications can be added to the above embodiment. Some examples of the variants of the above embodiment are given below.

(1) In the above embodiment, the printer 10 creates bit-mapped data. However, a device other than a printer may create bit-mapped data utilizing the technique of the above embodiment.

(2) In the receiving process of FIG. 2, the printer 10 downloads the XHTML data 70 by sending the download request instruction a plurality of times. That is, the XHTML data 70 is downloaded in a small fraction at a time. However, the printer 10 may download all the XHTML data 70 by sending one download request instruction. Further, in the layout process of FIG. 5, the style sheet file 80 may be downloaded by sending the download request instruction over a plurality of times, or the entire style sheet file 80 may be downloaded by sending one download request instruction. Further, in the rasterize process of FIG. 7, the one image data file may be downloaded by sending the download request instruction over a plurality of times, or the entirety of the one image data file may be downloaded by sending one download request instruction. Since the print process starts at a quicker timing when the download request instruction is sent in a plurality of times, the waiting time from the user instructing printing until the printed article being done becomes shorter.

(3) In the above embodiment, the XHTML data 70 is downloaded in n byte units. That is, the amount of data that is downloaded is constant. However, the amount of data may be changed for each downloading (for each download request instruction).

(4) The download process portion 24 may not be present. In this case, the receiving process portion 18, the layout process portion 20, and the rasterize process portion 22 may perform processes to write information into the tables 100 and 130, processes to prohibit downloading from being performed in parallel from the same external device 50 in accordance with the information in the tables 100 and 130, etc. That is, the receiving process portion 18, the layout process portion 20, and the rasterize process portion 22 may also function as the download process portion 24.

(5) Two or more tasks of the present embodiment may be combined into one task. For example, the receiving task and the layout task may be combined. Further, for example, the layout task and the rasterize task may be combined. Alternatively, one task in the present embodiment may be divided into a plurality of tasks. For example, the analysis process of S64 of the layout process of FIG. 5 may be made into one task. Further, tasks other than the tasks set forth in the above embodiment may further be adopted.

(6) In the above embodiment, one item of the session combination data 120 (see FIG. 12) is created for the combination of the IP address 104 and the port number 106. However, one item of the session combination data 120 may be created for only the IP address 104.

(7) The technique of the present embodiment may be adopted, as well, in the case where bit-mapped data is created based on data other than the XHTML-Print data 70.

What is claimed is:

1. A print data creation device for creating print data by performing a plurality of tasks, comprising a first task and a second task, in parallel, the print data creation device comprising:
 a memory configured to store, for each of a plurality of external devices, a network address, a port number, and a communication state in association with each other; and
 a controller configured to:
  identify a first network address and a first port number of a first external device;
  determine whether the first network address and the first port number are stored in association with each other in the memory when the first task comprising downloading first data from the first external device is to be performed;
  store the first network address and the first port number in the memory upon determining that the first network address and the first port number are not stored in association with each other in the memory;
  perform the first task comprising downloading the first data from the first external device after associating a lock state with the first network address and the first port number in the memory;
  associate an unlock state, instead of the lock state, with the first network address and the first port number, in a case where downloading the first data from the first external device has been completed;
  determine whether the first network address and the first port number are stored in association with each other in the memory when second data is to be downloaded from the first external device, the second data being image data used to perform the second task;
  postpone downloading the second data from the first external device until the lock state associated with the first network address and the first port number is changed to the unlock state, in a case where it is determined that the first network address and the first port number are being stored in association with each other in the memory and the lock state is associated with the first network address and the first port number;
  download the second data from the first external device after re-associating the lock state with the first network address and the first port number, in a case where the lock state associated with the first network address and the first port number has been changed to the unlock state;
  perform the second task comprising creating the print data by rasterizing the second data;
  download third data from the first external device in accordance with an address of the third data, wherein the first data comprises the address of the third data related to a layout of the image data; and
  perform a third task comprising determining the la out of the image data based on the third data,
  wherein the image data is disposed in accordance with the determined layout to create the print data.

2. The print data creation device as in claim 1, wherein the controller is further configured to receive a print job creating request including an address of the first data, wherein performing the first task comprises downloading the first data from the first external device in accordance with the address of the first data included in the print job creating request.

3. The print data creation device as in claim 1, wherein the controller is further configured to: identify a second network address and a second port number of a second external device which is different from the first external device;
 determine whether the second network address and the second port number are stored in association with each other in the memory when particular data is to be downloaded from the second external device;
 store the association of the second network address and the second port number in the memory upon determining that the second network address and the second port number are not stored in association with each other in the memory; and
 download the particular data from the second external device after associating the lock state with the second network address and the second port number in the memory, even if the lock state is associated with the first network address and the first port number in the memory.

4. The print data creation device as in claim 1, wherein the controller comprises a processor, and wherein the memory stores computer executable instructions that, when executed by the processor, cause the processor to operate as the controller.

5. A print data creation device for creating print data by performing a plurality of tasks, comprising a first task and a second task, in parallel, the print data creation device comprising:
- a memory configured to store, for each of a plurality of external devices, a network address, a port number, and a communication state in association with each other; and
- a controller configured to:
   - identify a first network address and a first port number of a first external device;
   - determine whether the first network address and the first port number are stored in association with each other in the memory when first data is to be downloaded from the first external device, the first data being used to perform the first task;
   - store the first network address and the first port number in the memory upon determining that the first network address and the first port number are not stored in association with each other in the memory;
   - download the first data from the first external device after associating a lock state with the first network address and the first port number in the memory;
   - associate an unlock state, instead of the lock state, with the first network address and the first port number, in a case where downloading the first data from the first external device has been completed;
   - determine whether the first network address and the first port number are stored in association with each other in the memory when second data is to be downloaded from the first external device, the second data being image data used to perform the second task;
   - postpone downloading the second data from the first external device until the lock state associated with the first network address and the first port number is changed to the unlock state, in a case where it is determined that the first network address and the first port number are being stored in association with each other in the memory and the lock state is associated with the first network address and the first port number;
   - download the second data from the first external device after re-associating the lock state with the first network address and the first port number, in a case where the lock state associated with the first network address and the first port number has been changed to the unlock state;
   - perform the second task comprising creating print data by rasterizing the second data;
   - download third data from the first external device in accordance with an address of the third data, wherein the first data comprises the address of the third data related to a layout of the image data; and
   - perform a third task comprising determining the layout of the image data based on the third data,
   - wherein the image data is disposed in accordance with the determined layout to create the print data.

6. The print data creation device as in claim 5, wherein the controller is further configured to receive a print job creating request including an address of the first data, wherein the downloading of the first data comprises downloading the first data from the first external device in accordance with the address of the first data included in the print job creating request.

7. The print data creation device as in claim 5, wherein the controller is further configured to: identify a second network address and a second port number of a second external device which is different from the first external device;
- determine whether the second network address and the second port number are stored in association with each other in the memory when particular data is to be downloaded from the second external device;
- store the association of the second network address and the second port number in the memory upon determining that the second network address and the second port number are not stored in association with each other in the memory; and
- download the particular data from the second external device after associating the lock state with the second network address and the second port number in the memory, even if the lock state is associated with the first network address and the first port number in the memory.

8. The print data creation device as in claim 5, wherein the controller comprises a processor, and wherein the memory stores computer executable instructions that, when executed by the processor, cause the processor to operate as the controller.

9. A non-transitory computer readable medium storing computer executable instructions that, when executed by an apparatus, cause the apparatus to:
- identify a first network address and a first port number of a first external device;
- determine whether the first network address and the first port number are stored in association with each other in memory of the apparatus when a first task comprising downloading first data from the first external device is to be performed;
- store the first network address and the first port number in the memory upon determining that the first network address and the first port number are not stored in association with each other in the memory;
- perform the first task comprising downloading the first data from the first external device after associating a lock state with the first network address and the first port number in the memory;
- associate an unlock state, instead of the lock state, with the first network address and the first port number, in a case where downloading the first data from the first external device has been completed;
- determine whether the first network address and the first port number are stored in association with each other in the memory when second data is to be downloaded from the first external device, the second data being image data used to perform a second task in parallel with the first task;
- postpone downloading the second data from the first external device until the lock state associated with the first network address and the first port number is changed to the unlock state, in a case where it is determined that the first network address and the first port number are being stored in association with each other in the memory and the lock state is associated with the first network address and the first port number;
- download the second data from the first external device after re-associating the lock state with the first network address and the first port number, in a case where the lock state associated with the first network address and the first port number has been changed to the unlock state;
- perform the second task comprising creating print data by rasterizing the second data;

download third data from the first external device in accordance with an address of the third data, wherein the first data comprises the address of the third data related to a layout of the image data; and perform a third task comprising determining the layout of the image data based on the third data, wherein the image data is disposed in accordance with the determined layout to create the print data.

10. A non-transitory computer readable medium storing computer executable instructions that, when executed by an apparatus, cause the apparatus to:

identify a first network address and a first port number of a first external device;

determine whether the first network address and the first port number are stored in association with each other in memory of the apparatus when first data is to be downloaded from the first external device, the first data being used to perform a first task;

store the first network address and the first port number in the memory upon determining that the first network address and the first port number are not stored in association with each other in the memory;

download the first data from the first external device after associating a lock state with the first network address and the first port number in the memory;

associate an unlock state, instead of the lock state, with the first network address and the first port number, in a case where downloading the first data from the first external device has been completed;

determine whether the first network address and the first port number are stored in association with each other in the memory when second data is to be downloaded from the first external device, the second data being image data used to perform a second task in parallel with the first task;

postpone downloading the second data from the first external device until the lock state associated with the first network address and the first port number is changed to the unlock state, in a case where it is determined that the first network address and the first port number are being stored in association with each other in the memory and the lock state is associated with the first network address and the first port number;

download the second data from the first external device after re-associating the lock state with the first network address and the first port number, in a case where the lock state associated with the first network address and the first port number has been changed to the unlock state;

perform the second task comprising creating print data by rasterizing the second data;

download third data from the first external device in accordance with an address of the third data, wherein the first data comprises the address of the third data related to a layout of the image data; and perform a third task comprising determining the la out of the image data based on the third data, wherein the image data is disposed in accordance with the determined layout to create the print data.

* * * * *

UNITED STATES PATENT AND TRADEMARK OFFICE
CERTIFICATE OF CORRECTION

| | | |
|---|---|---|
| PATENT NO. | : 8,769,107 B2 | Page 1 of 1 |
| APPLICATION NO. | : 12/241749 | |
| DATED | : July 1, 2014 | |
| INVENTOR(S) | : Yasuhiro Kudo | |

It is certified that error appears in the above-identified patent and that said Letters Patent is hereby corrected as shown below:

In the Claims

Column 18, Claim 1, Line 33:
    Please delete "la out" and replace with --layout--

Column 19, Claim 5, Line 55:
    Please delete "la out" and replace with --layout--

Column 22, Claim 10, Line 26:
    Please delete "la out" and replace with --layout--

Signed and Sealed this
First Day of December, 2015

Michelle K. Lee
*Director of the United States Patent and Trademark Office*